UNITED STATES PATENT OFFICE.

JÜRGEN CALLSEN, OF ELBERFELD, AND WILHELM GRÜTTEFIEN, OF VOHWINKEL, NEAR ELBERFELD, GERMANY, ASSIGNORS TO SYNTHETIC PATENTS CO. INC., OF NEW YORK, N. Y., A CORPORATION OF NEW YORK.

PHARMACEUTICAL PRODUCT CONTAINING ARSENIC AND PROCESS OF MAKING SAME.

1,201,692.     Specification of Letters Patent.     Patented Oct. 17, 1916.

No Drawing.     Application filed July 29, 1916. Serial No. 112,134.

*To all whom it may concern:*

Be it known that we, JÜRGEN CALLSEN and WILHELM GRÜTTEFIEN, doctors of philosophy, chemists, citizens of the German Empire, residing at, respectively, Elberfeld and Vohwinkel, near Elberfeld, Germany, have invented new and useful Improvements in Pharmaceutical Products Containing Arsenic and Processes of Making Same, of which the following is a specification.

This invention relates to new organic arsenic compounds characterized by their molecular structures being constituted in part of the following atomic group:

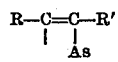

wherein R and R' each represent radicals such as hydrogen, alkyl, aralkyl, aryl and to processes of making the same.

The invention pertains more particularly to those compounds whose molecules consist mainly of the atomic group:

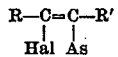

wherein R and R' each represent hydrogen or hydrocarbon radicals such as alkyl, aralkyl or aryl, and Hal a halogen.

As specific classes of compounds comprised by this invention there may be mentioned the alkinehaloarsendihalids having the general formula:

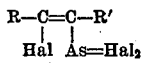

obtainable by combining arsenic trihalid with alkines (hydrocarbons of the acetylene series); the alkinehaloarsenoxids (haloarsenosoalkylenes) having the general formula:

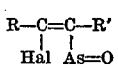

obtainable by treating the alkinehaloarsendihalids with water; and the alkinehaloarsinic acids having the general formula:

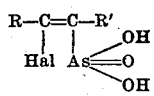

obtainable by oxidizing the above mentioned alkinehaloarsenoxids.

As alkines to be used as starting materials the higher acetylenic hydrocarbons, such as hexin, heptin, octin and their isomers, are especially desirable. The resulting arsinic acids, produced in the manner briefly described above are of great value in the treatment of anemia, chlorosis, leucemia, chorea or skin diseases, the administration being by intramuscular injections or also for inner use. The above mentioned haloarsendihalids and haloarsinoso compounds are useful in the manufacture of pharmaceutical products.

The process of preparing the above substances may be illustrated somewhat more in detail by the following examples:

Example 1: 240 parts of heptin (n-pentylacetylene) are heated with 900 parts of arsenic trichlorid for 16 hours under a reflux condenser. The unused arsenic trichlorid is distilled off *in vacuo*. The remaining oily residue is dissolved in 3,000 parts of wet ether. Anilin is then added until a filtered sample does not give any further precipitation. The whole liquid is then filtered by which means the precipitated anilinhydrochlorid is removed from the chlorarsinoso compound which remains in ethereal solution. The ethereal solution is first washed with water, acidulated with hydrochloric acid and then with pure water until the wash water does not show an acid reaction when tested with Kongo paper. After drying over sulfate of sodium the ether is completely distilled off *in vacuo*. The heptinchlorarsenoxid remains as a thick dark liquid, which affects somewhat the skin.

Example 2: 44 parts of heptinchlorarsenoxid are dissolved in 400 parts of acetone and treated with a 3 per cent. solution of peroxid of hydrogen under cooling and stirring until a sample of the liquid colors titanium solution yellow, even after longer standing. The thus obtained solution of arsinic acid is shaken with 500 parts of ether, separated, the ether is once more washed with dilute caustic soda solution and water. The alkalin wash water is again acidulated with hydrochloric acid and the collected watery solutions are evaporated *in vacuo* at 60 to 70° until the arsinic acid crystallizes out. After cooling, the thus obtained heptinchlorarsinic acid is filtered off, washed with a little ether in order to remove slight quantities of oily admixtures and finally recrystallized from 50 parts of hot water under the addition of charcoal. The heptinchlorarsinic acid separates in white needles which are filtered off and washed with water. Melting point 115°. In order to produce the sodium salt, the crystallized acid is suspended in a little water and treated with caustic soda solution until a faint alkaline reaction is observed. The solution is precipitated with acetone, the sodium salt is filtered off and recrystallized from alcohol. It forms white, shiny leaflets which are easily soluble in water, the solution possessing neutral reaction. The heptinchlorarsinic acid, therefore, forms a mono-sodium salt just like other arsinic acids.

Example 3: 110 parts of octin (n-hexyl-acetylene) are heated with 600 parts of arsenic tribromid in a steam bath for 15 hours. After cooling the mass of reaction is dissolved in 2,000 parts of ether and treated with anilin until a filtered sample does not give a further precipitation when more anilin is added. The precipitate is filtered off, the ethereal solution is washed with water containing hydrochloric acid and then with pure water until the wash water shows neutral reaction. After drying over sulfate of sodium the ether is completely distilled off *in vacuo*. The octinbromarsenoxid forms a dark brown oily liquid which is miscible with ether, chloroform and benzol in every proportion.

Example 4: 56 parts of octinbromarsenoxid are dissolved in 400 parts of acetone and oxidized and further treated as described in Example 2. After evaporating the watery solution *in vacuo*, filtering and washing with ether, the octinbromarsinic acid is left behind as a white crystalline mass which recrystallized from 150 parts of hot water, crystallizes in long, colorless, shiny needles. Melting point 129 to 130°.

Example 5: Octin (n-hexyl-acetylene) is treated as described in Example 2 with arsenic tribromid. The unused arsenic tribromid is distilled off *in vacuo* and 85 parts of the residue are dissolved in dry bisulfid of carbon. This solution, under cooling with ice and under stirring is slowly treated with a solution of 32 parts of bromin in bisulfid of carbon. The liquid is allowed to stand for a short time and then shaken with an equal volume of cold water. After drying, both layers are distilled off separately *in vacuo*. The residue of the bisulfid of carbon solution is taken up with ether. The ether solution is washed with dilute caustic soda solution and water, and the watery solution is again acidified. The residue of the watery layer is dissolved in warm water, separated from impurities by filtration, and the collected watery solutions are concentrated *in vacuo* until octinbromarsinic acid begins to crystallize. The crystallized acid is filtered off, washed with a little ether and recrystallized from water.

In some cases it is desirable to convert the arsinic acids into their salts, as for instance into their sodium salts.

In the above examples the specific halid of arsenic used may be substituted by either of the other halids and give similar results. Instead of arsenic halids there may be used at the start mixtures which have a tendency to react to form arsenic halids such as a mixture of arsenous acid and thionyl chlorid.

We claim:

1. A product comprising a substance whose molecule has the atomic group:

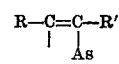

wherein R and R' each represent hydrogen or a hydrocarbon radical.

2. A product comprising a substance whose molecule has the atomic group:

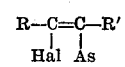

wherein R and R' each represent hydrogen or a hydrocarbon radical, Hal denotes a halogen.

3. As a new product, a substance whose molecule comprises the following atomic grouping:

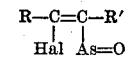

wherein R and R' each represent hydrogen or a hydrocarbon radical and Hal denotes a halogen.

4. As a new product, a substance having the following divalent acid radical:

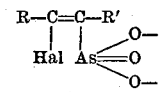

wherein R and R' each represent hydrogen or a hydrocarbon radical and Hal denotes a halogen.

5. As a new product, a substance having the following formula:

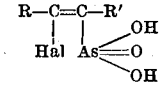

wherein R and R' each represent hydrogen or a hydrocarbon radical and Hal denotes a halogen.

6. As a new product, a substance having the following formula:

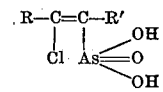

wherein R and R' each represent hydrogen or a hydrocarbon radical.

7. As a new product, a heptinehaloarsinic acid.

8. As a new product, heptinechlorarsinic acid.

9. The process of producing an organic arsinic acid which comprises inducing a reaction between an arsenic trihalid and an acetylene hydrocarbon, treating the resulting haloarsendihalid with water to convert it into the corresponding arsenoxid compound, and oxidizing the latter to form the corresponding haloarsinic acid.

10. The process of producing an organic derivative of arsenic which comprises inducing a reaction between an acetylene hydrocarbon and an arsenic halid.

11. The process of producing an organic arsendihalid which comprises inducing a reaction between an arsenic trihalid and an acetylenehydrocarbon.

12. The process of producing an alkinehaloarsenoxid which comprises treating with water an alkinehaloarsendihalid.

13. The process of producing an organic derivative of arsenic which comprises oxidizing an alkinehaloarsenic oxid.

14. The process of producing heptinechlorarsinic acid which comprises subjecting heptinechlorarsenoxid to the action of hydrogen peroxid.

In testimony whereof we have hereunto set our hands in the presence of two subscribing witnesses.

JÜRGEN CALLSEN. [L. S.]
WILHELM GRÜTTEFIEN. [L. S.]

Witnesses:
HELEN NUFER,
ALBERT NUFER.